UNITED STATES PATENT OFFICE.

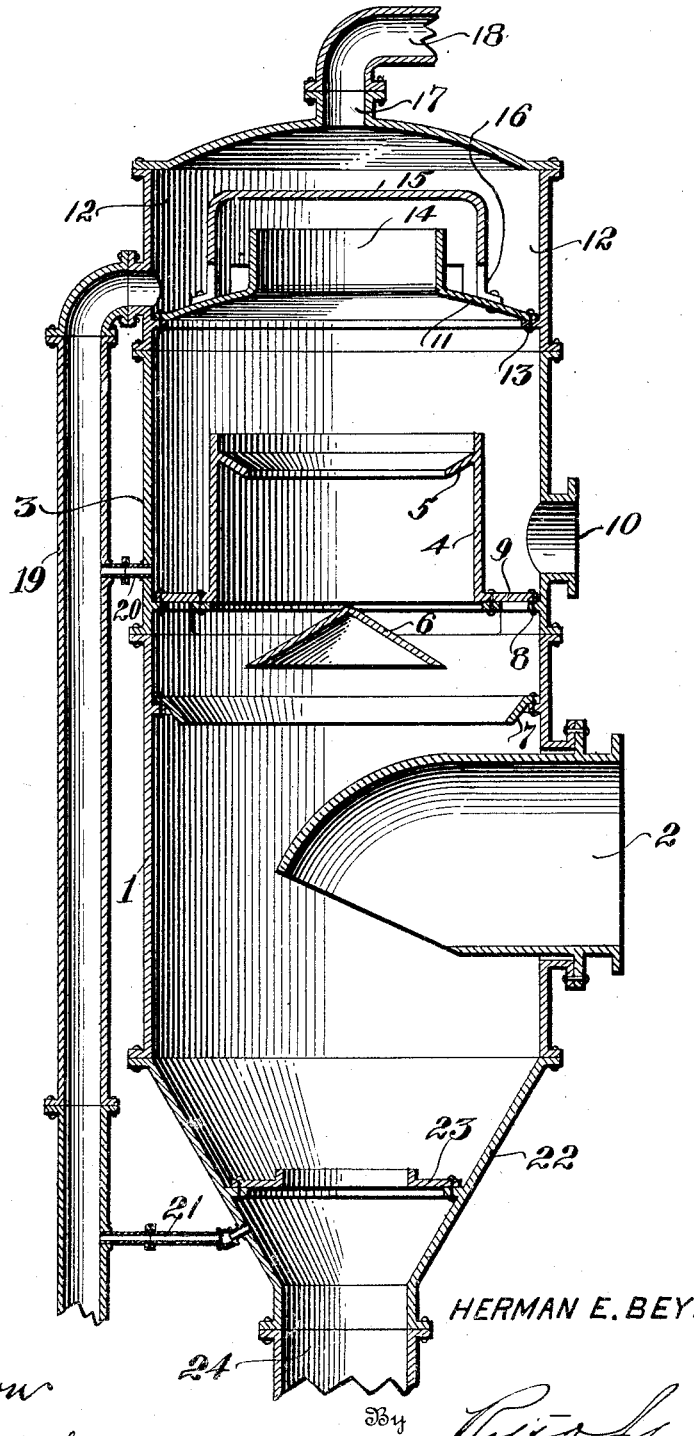

HERMAN E. BEYER, OF PHILADELPHIA, PENNSYLVANIA.

COUNTER-CURRENT CONDENSER.

1,162,969.   Specification of Letters Patent.   Patented Dec. 7, 1915.

Application filed November 10, 1914. Serial No. 871,257.

*To all whom it may concern:*

Be it known that I, HERMAN E. BEYER, a citizen of the United States of America, residing at Philadelphia, in the county of Philadelphia and State of Pennsylvania, have invented certain new and useful Improvements in Counter-Current Condensers, of which the following is a specification.

My invention relates to counter-current condensers for steam and other vapor laden gases.

I have discovered that in counter-current condensation the best results are obtained when the whole process is a slow one, by which I mean that the condensing apparatus, as a whole, should be designed to cause the steam to enter at a slow velocity, and to provide a slow velocity of cooling water meeting the steam, a slow velocity of hot water running off, and particularly a slow velocity of the moisture laden air in its passage from the top of the condenser through the water separator, which is necessarily placed between the condenser and the air pump. The present counter-current condensers fail to provide for this slow removal of the air from the top of the condenser and through the water separator, and this is one of the causes for their tendency when they get "hot" or "boil", as described in Weiss Patent No. 496,761, to change to parallel current condensation, and by siphonic action to flood the air pump, due to the suction or wiredrawing action of the out-flowing air on the necessarily large amount of water lying in the weir or pond immediately below the air suction pipe at the top of the condenser. By causing a slow outflow of air from the condenser, I not only minimize any undesirable effect of the outflowing air on this pool of water but I obtain a marked advantage in the treatment of the moisture laden air in the water separator to remove therefrom as much moisture as possible before it reaches the air pump.

From a commercial standpoint it is important to attain these ends by the simplest and least expensive means possible, and to this end I have, by experiment, found that such ends are best served by the arrangement of the water separator above or on top of the condenser proper, and as certain important results follow from this particular location of the water separator, I desire to claim broadly as part of my invention such relative arrangement of condenser and separator. One advantage of this arrangement, apart from its cheapening of construction, is that it lends itself peculiarly to attaining the desired slow withdrawal of air from the condenser. Thus, by superimposing the separator on the condenser I can, with economy of space and simplicity of construction, give the air inlet port thereinto many times the diameter of the air discharge port to the air pump, so that the updraft from the top of the water level of the weir above mentioned is materially decreased without, however, affecting its volume. The utilization of the wide shallow separating chamber has many advantages wherever disposed.

Another important feature of my invention is the provision, in such a separator, of baffle means to cause a tortuous flow of the air therethrough, for this not only prevents any tendency of the water when ejected under "boiling" or parallel flow conditions into the separator to flood into the air pump line, but it also forces the air entering the bottom of the separator to flow outwardly and radially with decreasing velocity to the side wall of the separator and to move slowly up along this wall and along under the wide dome to the pump line. The separator walls being cool and the air flow slow, a more complete separation of moisture is obtained than where the air is treated at high velocities. Moreover, by designing the baffle to change the direction of flow of the air where it strikes the separator wall, *i. e.*, where its volume is greatest and its velocity lowest, the most complete separation of its moisture content is obtained. Also, the cooling of the bottom dome of the separator, which forms the top of the condenser proper, by the moisture deposited thereon in the manner described, is of marked advantage in keeping the temperature of the whole top part of the condenser cool.

Another important feature of my invention is the arrangement of the water separator to water seal itself under flooded conditions, should such occur, and thereby to automatically shut off connection between the air pump and condenser proper and lower the vacuum in the latter.

It will be noted that I employ no moving parts or valves to obtain this lowering of the vacuum and thereby greatly simplify the apparatus, I also provide a safeguard against flooding the air pump under such conditions by providing the separator with an outlet or drain pipe which is large enough to carry off the sealing mass of liquid before it rises to a height sufficient to enter the air discharge nozzle.

Another feature of my invention consists in the utilization of the drain pipe for the separator as a condenser for any air drawn off from the lower end of the condenser in accordance with the principles of operation disclosed in my Letters Patent No. 1,041,954. The length of the pipe between the points of admission of the cooling water from the weir at the top of the condenser proper and the hot air from the condenser bottom, is sufficient to enable the falling liquid to accomplish its object without the necessity of sprays or baffles, thereby simplifying construction and avoiding a possible danger of the pipe becoming clogged through the interposition of weirs or baffles, which would have to be used, were this distance not so great.

My invention further comprises the novel details of construction and arrangements of parts which are hereinafter more particularly described and claimed, reference being had to the accompanying drawing which illustrates the preferred embodiment of my invention, and in which I show a vertical central cross sectional view through my improved condenser.

In the preferred embodiment of my invention, as illustrated, but to the detail construction of which I do not desire to be limited, I show a metallic condenser body 1 having any suitable shape, but, preferably cylindrical, and I admit the steam or vapor to be condensed thereinto through an inlet pipe 2 which preferably has a downwardly opening discharge orifice which causes the steam or vapor to enter the condenser body at or near its center and with a downward direction of flow. However the steam may be delivered into the condenser in any other manner as now practised in counter-current condensers. The condenser body is provided above the pipe 2 with a water reservoir 3 formed between the condenser body and a weir 4, there being any desired arrangement of baffles or deflectors such as 5, 6 and 7, which deliver the water in the manner best suited for the condensing operation. Preferably the condenser body is provided with an internal annular shoulder 8 upon which an out-turned flange 9 of the weir is bolted. Water is admitted to reservoir 3 by an inlet pipe 10 disposed below the top of the weir.

Above the water reservoir is a transverse partition or diaphragm 11 which forms the top of the condenser proper and also the bottom of the water separating compartment 12. This diaphragm is bolted to an internal flange 13 in the condenser body and is preferably arched upwardly toward an outlet nozzle 14, it being noted that the cross sectional area of the nozzle outlet port is very large. The nozzle projects up into an inverted cup shaped deflector or baffle 15 which rests on legs 16 that are attached to the top of the diaphragm 11. The lower edge of this deflector extends well below the top of the nozzle 14 but is sufficiently spaced from the diaphragm 11 to provide for a free passage of the air thereunder into the separating chamber.

It will be noted that the direction of travel of the moisture laden air is changed in passing over the nozzle 14 and again in passing under the baffle 15 and during this tortuous travel the air flows radially through a passage of increasing cross sectional area, thereby causing its velocity to be slowed down until it moves at a slow velocity in its passage upwardly and downwardly around the baffle to the air suction nozzle 17 to which is connected the suction pipe line 18 leading to an air pump or suitable suction means (not shown).

It will be noted that the cross sectional area of the air suction nozzle 17 is very small as compared with the cross sectional area of the nozzle 14, the object of this arrangement being to have the area of the two openings proportioned so as to insure the desired slow velocity travel of the air in leaving the condensing chamber and in passing through the separator. From the lower part of the separating chamber at one side I lead a drain pipe 19 which is of substantial capacity so that it will carry off water which may tend to flood the separator under parallel current condensation conditions before such water can rise sufficiently to pass into the suction pipe 18. I also provide a pipe 20 connecting the drain pipe 19 with the water reservoir 3 so that a small stream of water will flow into the pipe 19 and fall therethrough for the purpose of cooling the hot air taken from the bottom of the condenser through a pipe 21. This pipe 21 enters the bottom cone 22 of the condenser below an annular baffle 23 therein, and serves the important function of drawing off and discharging to the pump the air that is carried down below the baffle 23 and becomes trapped thereunder. The cone 22 is supported by a barometric waste pipe 24, which pipe and pipe 19 lead to the customary hot well or to other means (not shown) for the removal of the waste water. The drain pipe 19 serves as a supplemental support for the condensing apparatus. The arrangement of the pipe 21 and its objects and purposes form the subject matter of my Letters Patent No. 1,041,954.

The condenser body is preferably made in cylindrical sections which are riveted or flanged and bolted together for convenience in manufacture and shipment.

In practice, under normal counter-current condensation the cooling water entering the reservoir 3 and flowing over the edges of the weir 4 condenses the steam or vapor delivered into the condensing chamber through the inlet pipe 2, the air and incondensable gases passing upwardly through the falling currents of water and through nozzle 14 and then flowing in a tortuous path through the water separating compartment where as much as possible of the moisture therein is collected by condensation and drained off through pipe 19. The air thus relieved of this moisture is drawn off through pipe 18 to the air pump.

My arrangement provides for a slow withdrawal of the air from the condenser proper above the cooling water in the weir so that it does not tend by its velocity to induce flooding of this water into the separator, it being noted that the motion of the out going air is not accelerated substantially until it approaches the air suction nozzle in the water separator where its velocity will not produce undesirable effects either on the condensing or separating processes.

Having thus described my invention, what I claim as new and desire to secure by Letters Patent, is:—

1. A method of counter-current condensation which consists in drawing off the air from the condenser at a point above its cooling water reservoir at a low velocity and preventing the air accelerating its velocity substantially in the condenser proper.

2. In a counter-current condenser, the combination of the air suction pipe of the condenser, and means to water-seal said pipe under conditions of parallel current condensation.

3. In a counter-current condenser comprising a condensing and a separating chamber, an air suction pipe leading from the separating chamber, and means in said separating chamber to form a water-seal when water floods thereinto.

4. In a counter-current condenser, a condensing chamber, a wide shallow separating chamber communicating with the top of the condensing chamber, a water drain for the separating chamber, an air suction pipe leading from the upper end of the separating chamber, and a partition within the chamber adapted to form a water-seal therein when water from the condensing chamber flushes thereinto.

5. In a counter-current condenser, a condensing chamber, and a chamber superimposed on the condensing chamber and comprising means to separate moisture from air passing therethrough, substantially as described.

6. In a counter-current condenser, a condensing chamber, and a chamber having means for the separation of moisture from air disposed above the condensing chamber and communicating therewith and with the air suction, substantially as described.

7. In a counter-current condenser, a casing comprising in its lower portion the condenser proper and in its upper portion a water separating compartment which communicates with the condensing compartment, an air suction pipe leading from the separating compartment, and means to drain off water from both portions of the casing, substantially as described.

8. A counter-current condenser comprising a casing having a steam inlet and a water outlet in its lower end, a weir arranged at an intermediate point in the casing above the steam outlet, a water supply pipe for the weir, a partition above the weir having a large central opening therein, a baffle above said opening in the partition, and a drain pipe and an air suction pipe leading from the casing above said partition, substantially as described.

9. A counter-current condenser comprising a casing of substantially uniform diameter, an apertured partition across the casing to form a water separating chamber in the upper end thereof, a drain pipe and an air suction pipe for the separating chamber, said air suction pipe having a cross sectional area which is substantially less than that of the air inlet aperture in said partition.

10. In a counter-current condenser, a condensing chamber, a wide shallow separating chamber having an inlet port communicating with the condensing chamber and an air suction discharge port which is greatly smaller in cross sectional area than the inlet port, and means to drain off the water from said chambers, substantially as described.

11. In a counter-current condenser, a condensing chamber, a separating chamber having a bottom inlet which communicates with the condensing chamber and a top suction outlet for the discharge of air, and means to drain said chambers.

12. In a counter-current condenser, a wide shallow separating chamber having a bottom inlet port and a top suction discharge port, a baffle interposed between said ports to prevent direct communication, and means to drain said chamber.

13. In a counter-current condenser, a condensing chamber, a separating chamber having a bottom inlet passage, which connects it with the top of the condensing chamber, and a top air suction pipe, a wide baffle interposed between the said port and pipe, and means to drain said separating chamber.

14. In a counter-current condenser, a water separating chamber having a bottom inlet pipe which projects upwardly thereinto, an inverted cupped deflector disposed over said pipe and spaced from the sides and top of the separating chamber, and an air suction pipe leading from the upper end of said chamber.

15. In a counter-current condenser, a water separating chamber having an air inlet nozzle of large diameter which projects above its bottom, a cupped deflector disposed over said nozzle and having its bottom edge below the top of the nozzle, a drain leading from the lower end of said chamber, and an air suction pipe which enters the upper end of said chamber.

16. In a counter-current condenser, a casing having a dome like partition therein to divide off a water separating compartment in the upper end of the chamber, said partition having a large central opening surrounded by a nozzle projecting into the separating chamber, and a cupped deflector disposed above said nozzle and having its lower edge spaced from said nozzle and from the bottom and side walls of the separating chamber to form a tortuous passage for the air through said chamber, a drain pipe for said chamber, and an air suction pipe leading from above the deflector, substantially as described.

17. In a condenser having a separating compartment disposed above its condensing compartment, a baffle in the lower end of the condensing compartment, a drain pipe leading downwardly from the separating compartment, means to discharge a stream of water into said pipe near its upper end, and means to draw off trapped air from below the baffle in the condenser and deliver it into said pipe at a point substantially spaced from the water inlet thereinto, substantially as described.

18. In a condenser having an overhead water separator provided with an air suction outlet and a drain pipe, a water reservoir in the upper part of the condenser, a pipe leading therefrom into said drain pipe, and a pipe to carry off air from the lower part of the condenser and deliver it into said drain pipe at a point spaced substantially below the water inlet thereinto, said drain pipe being free of baffles and weirs, substantially as described.

19. In a condenser, a wide shallow separating chamber having a large central bottom inlet opening and a contracted top outlet opening, a horizontal baffle to prevent direct passage of air between said openings, vertical substantially annular baffles forming a tortuous passage for the air and adapted to form a water-seal, and a drain pipe for said chamber.

20. A condenser comprising a cylindrical sectional casing having intermediate apertured partitions which subdivide it into a lower condensing chamber, an intermediate water chamber, and an overhead separating chamber, an air suction outlet for the separating chamber, means therein to increase the deposit of moisture on the bottom of the separating chamber to thereby cool the top of the condenser proper, and means to drain the separating and condensing chambers, substantially as described.

21. In a counter-current condenser, a condensing chamber, a water separating chamber above the condensing chamber and communicating with the upper end thereof, and a drain pipe for the separating chamber having a connection to the lower end of the condensing chamber, as and for the purposes described.

In testimony whereof I affix my signature in presence of two witnesses.

HERMAN E. BEYER.

Witnesses:
 R. D. JOHNSTON, Jr..
 NOMIE WELSH.